(12) United States Patent
Chian et al.

(10) Patent No.: US 6,862,165 B2
(45) Date of Patent: Mar. 1, 2005

(54) METHOD AND APPARATUS FOR VALVE CONTROL

(75) Inventors: Brent Chian, Plymouth, MN (US); Timothy J. Nordberg, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/456,110

(22) Filed: Jun. 6, 2003

(65) Prior Publication Data
US 2004/0246752 A1 Dec. 9, 2004

(51) Int. Cl.⁷ .................... H01H 9/00; F16K 31/02
(52) U.S. Cl. .................... 361/160; 251/129.01
(58) Field of Search ................ 361/160; 323/165; 251/129.01, 129.02, 129.06, 129.15; 122/14.2

(56) References Cited

U.S. PATENT DOCUMENTS

| | | | |
|---|---|---|---|
| 4,700,888 A | * 10/1987 | Samulak | 237/2 A |
| 4,834,284 A | 5/1989 | Vandermeyden | 236/20 |
| 6,059,195 A | 5/2000 | Adams et al. | 236/20 |
| 6,158,715 A | * 12/2000 | Kirschbaum | 251/129.06 |
| 6,701,874 B1 | * 3/2004 | Schultz et al. | 122/14.2 |
| 2002/0132202 A1 | 9/2002 | Clifford | 431/264 |

* cited by examiner

Primary Examiner—Adolf Berhane (57) ABSTRACT

A valve control circuit in accordance with the invention comprises a direct current (DC) voltage source and a DC-DC step-up converter coupled with the DC voltage source. The circuit also comprises a programmable controller coupled with the DC-DC converter, a first valve control switch coupled with the DC source and the controller, and a first valve coupled with the first valve control switch. The circuit further comprises a valve-picking circuit coupled with the controller such that a current source of the valve-picking circuit is selectively coupled with the first valve control switch to open the first valve in response to electrical signals from the controller.

35 Claims, 5 Drawing Sheets

METHOD AND APPARATUS FOR VALVE CONTROL

FIELD

The present invention relates generally to valve control and, more specifically, to circuits for valve control.

BACKGROUND

Various applications exist where low voltages are used to power a circuit or system. As one example, gas powered appliances may use a self-powered control circuit and/or system. In this respect, a thermally activated power source is used to provide electrical power to such a control circuit and/or system. Such thermally activated power sources typically have limited voltage potential as well as current generating capacity. In the context of gas-powered appliances, such a thermally activated power source may be used to control millivolt gas valves. For example, in a water heater application, a thermally activated power source may be used to power a low-power control circuit that controls a pilot valve and a main burner valve for the water heater. As was just indicated, these valves are typically millivolt valves, which may be operated with voltages in the millivolt range.

However, such circuits may have limitations. For example, a millivolt valve may draw approximately 10 milliamperes (ma) of current to "hold the valve" (keep it open once actuated) but may draw approximately 25 ma of current to "pick the valve" (actuate and/or open the valve). Depending on the current used by a particular embodiment, and the current generating capability of a thermally activated power source used in such an embodiment, there may be insufficient current supplied by the thermally activated power source to pick a second valve once a first valve is picked and being held. Therefore, alternative approaches for implementing such circuits and systems may be desirable.

SUMMARY

A valve control circuit in accordance with the invention comprises a direct current (DC) voltage source and a DC-DC step-up converter coupled with the DC voltage source. The circuit also comprises a programmable controller coupled with the DC-DC converter, a first valve control switch coupled with the DC source and the controller, and a first valve coupled with the first valve control switch. The circuit further comprises a valve-picking circuit coupled with the controller such that a current source of the valve-picking circuit is selectively coupled with the first valve control switch to open the first valve in response to electrical signals from the controller.

BRIEF DESCRIPTION OF THE DRAWINGS

The subject matter regarded as the invention is particularly pointed out and distinctly claimed in the concluding portion of the specification. The invention, however, as to both organization and method of operation, together with features and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood that the present invention may be practiced without these specific details. In other instances, well-known methods, procedures, components and circuits have not been described in detail, so as not to obscure the present invention.

Figure 1:
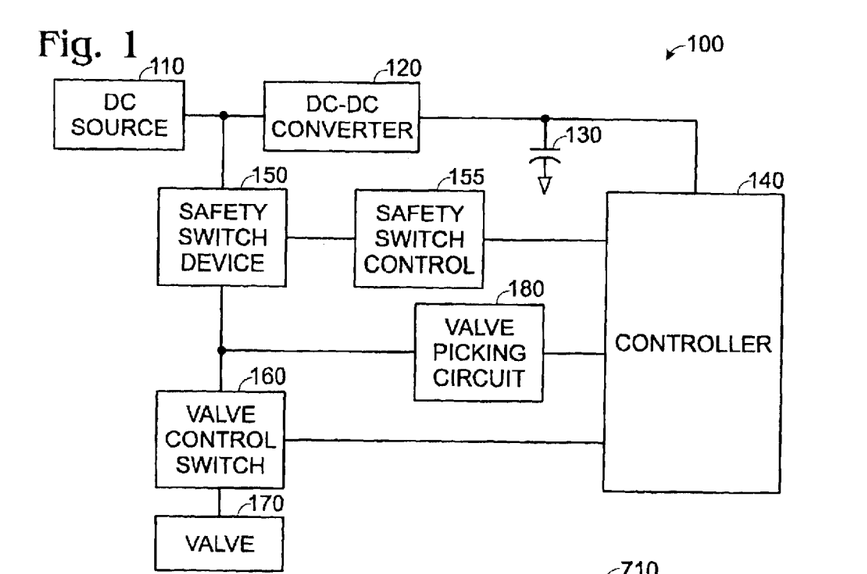
FIG. 1 is a block diagram illustrating a valve control circuit in accordance with an embodiment of the invention.

Referring now to FIG. 1, a block diagram of a control circuit 100 for valve control is shown. The circuit 100 comprises a direct current (DC) voltage source 110. The DC source 110 may be, for example, a thermally activated DC source though the invention is not limited in this respect. Such thermally active sources include thermopile devices, which typically include serially coupled thermocouple devices. Thermopile devices are typically used in, for example, gas powered appliances, such as water heaters.

For the circuit 100, the DC source 110 is coupled with a DC to DC (DC-DC) converter 120. For this particular embodiment, the DC-DC converter 120 comprises a step up converter, which may be a single stage converter or a multi-stage converter, depending on the particular application. The DC-DC converter 120 is coupled with a charge storage device 130, which for the circuit 100 takes the form of a capacitor. The charge storage device 130 stores voltage generated by the DC-DC converter 120, which may be termed a stepped-up voltage. The stepped-up voltage is higher in potential than the DC voltage produced by the DC source 110. The DC-DC converter and the charge storage device 130 are also coupled with a programmable controller circuit 140. Such a controller circuit may comprise a microcontroller, or the like. For this embodiment, the controller 140 is a low-power device, which has limited current consumption, such as in the sub-milliampere range.

The circuit 100 further includes a safety switch device 150, which is controlled by a safety switch control circuit 155. The safety switch control circuit 155 is coupled with the controller 140. The controller 140 may supply electrical signals to the safety switch control circuit 155, which, responsive to the electrical signals, closes the safety switch device 150 to allow current from the DC source 110 to flow through it. Conversely, if the controller 140 does not apply these electrical signals to the safety switch control circuit, as determined by the controller's 140 programming or due to a functional failure of the controller 140, for example, the safety switch device opens so that no current flows through it. Such a situation will result in any open valves (such as gas valves in a gas appliance) coupled with the circuit 100 to close, thereby preventing flow (such as gas flow) through the valve(s).

As just discussed, the safety switch device 150, when closed, allows current to flow through it from the DC source 110 to the valve control switch 160. The controller 140 is coupled with the valve control switch 160 and effects opening and closing of the valve control switch 160. The valve control switch 160, when closed contemporaneously with the safety switch 150 allows current to flow from the DC source 110 to a valve 170. Depending on the particular embodiment, the current from the DC source 110 may "pick" (open) the valve 170. However, as noted above, the DC source 110 may have insufficient current generation capability to pick the valve 170 due to the current being consumed by other components of the circuit 100, such as the controller 140, the safety control circuit 155, and other valves, such as is discussed in more detail below.

In this respect, the circuit 100 comprises a valve-picking circuit 180. The valve-picking circuit 180 may take any number of forms, some exemplary embodiments of which are discussed below. Briefly, the valve-picking circuit 180 stores electrical energy from the DC source 110 (via the controller 140). The valve-picking circuit 180 is then selectively coupled with the valve control switch 160 and the stored electrical energy is then employed to pick the valve 170 (e.g. supply at least a part of the transient current consumed to open the valve 170). The operation of the circuit 100 is substantially managed by the controller 140, which contains programming logic that is executed to control the operation of the safety switch control circuit 155, the valve control switch 160 and the valve-picking circuit 180. In this respect, the controller 140 produces appropriate electrical signals that effect the desired operation of the circuit 100.

Figure 2:
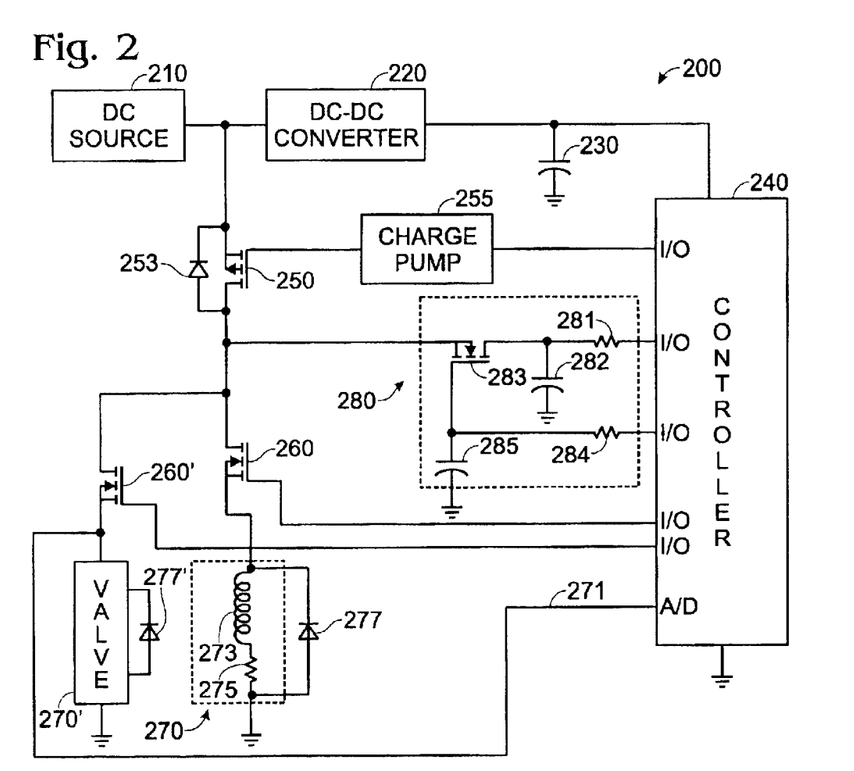
FIG. 2 is a schematic/block diagram illustrating a valve control circuit in accordance with an embodiment of the invention.

Referring now to FIG. 2, a schematic/block diagram of a valve control circuit 200 is shown. The circuit 200 comprises the same basic configuration as the circuit 100 shown in FIG. 1. In this respect, components of the circuit 200 that are analogous with the components of the circuit 100 are referenced with corresponding reference numbers. For example, the DC source 110 of FIG. 1 is analogous with a DC source 210 of FIG. 2. For the sake of brevity, these analogous components will only be discussed with regard to any additional detail, or any differences from the previously discussed circuit 100 shown in FIG. 1.

For the circuit 200, the safety switch device 250 takes the form of a p-type metal-oxide semiconductor transistor (PMOS) device. Also shown in FIG. 2 is a diode 253. The diode 253 is shown to represent the intrinsic diode that is formed by the PMOS safety switch device 250. The relevance of the diode 253 to the operation of the circuit 200 will be discussed further below with regarding to picking a valve. The safety switch control circuit 255 of the circuit 200 comprises a charge pump circuit coupled with a gate terminal of the safety switch device 250. The safety switch control circuit 255 is also coupled with the controller 240, which communicates electric signals to the charge pump to generate a negative voltage that is communicated to the PMOS safety switch device 250. This negative voltage "closes" the PMOS device and allows current from the DC source 210 to flow through it. In similar respect as was noted above, if the controller 240 ceases to "pump" the charge pump safety switch control circuit 255, the PMOS safety switch device 250 will open and current from the DC source 210 will not be able to flow through it. In this situation, any open valves of circuit 200 will close (e.g. stopping the flow of gas in a gas powered appliance).

The valve control switch 260 of the circuit 200 takes the form of an n-type metal-oxide semiconductor (NMOS) device. The valve control switch 260 is coupled with the controller 240, such that an electrical signal from the controller 240 effects "opening" and "closing" of the NMOS valve control switch 260. Closing the NMOS valve control switch 260 contemporaneously with the PMOS safety switch device 250 allows current to flow from the DC source 210 to the valve 270 of the circuit 200. The valve 270 comprises an inductor 273 and a resistor 275, which represent the inductance and resistance of a solenoid of the valve 270. A diode 277 is also coupled with the valve 270. The diode 277 is a so-called "freewheeling diode", which provides a current path for any current stored in the inductor 273 when the valve 270 is transitioned from an open state to a closed state.

The circuit 200 also comprises a second valve control switch 260' (also in the form of an NMOS device), a second valve 270' and a second freewheeling diode 277', which are coupled in parallel with the NMOS valve control switch 260, the valve 270 and the freewheeling diode 277. The first valve 270 and the second valve 270' may be, respectively, a millivolt pilot valve and a millivolt main burner valve in a gas appliance, such as a water heater, though the invention is not so limited.

As has been previously described, in the situation where one of the valves 270 or 270' is being held open with current supplied by the DC source 210, while the other valve is closed, the current supplied by the DC source 210 may be insufficient to supply the transient current to pick the second valve when it is desired to open that valve. As was also previously described, a valve-picking circuit, such as the valve-picking circuit 280 shown in FIG. 2, may supply this transient current. For the circuit 200, the valve-picking circuit 280 comprises a resistive-capacitive charge storage circuit that includes the resistor 281 and the capacitor 282 for supplying valve picking current to the valve 270. The charge storage circuit may also be referred to as a selectable (valve-picking) current source.

When the DC-DC converter 220 has generated a voltage on capacitor 230 (by stepping up the initial DC voltage produced by the DC source 210) that is greater than an operational threshold for the controller 240, the controller 240, which monitors this voltage, will begin to charge the capacitor 282. The resistive-capacitive charge storage circuit is charged by electrical energy from the capacitor 230 (and the DC-DC converter 220) via the controller 240. To effect such charging, an output driver of an input/output signal pin (I/O or I/O pin) of the controller 240 is activated (e.g. set to an "OUTPUT HIGH" state). In this configuration, current flows from the capacitor 230, through the controller 240 and through the resistor 281 to charge capacitor 282. In this particular embodiment, the capacitor 282 is a relatively large capacitor as compared to capacitor 230.

The resistor 281 regulates (e.g. limits) the transfer of energy from the capacitor 230 (via the controller 240) to the capacitor 282. The values of the resistor 281 and the capacitor 282 are determined based on how often the controller is able to communicate electrical energy from the capacitor 230 to the valve-picking charge storage circuit without adversely impacting the functions of the controller 240. In this respect, when the voltage present on the capacitor 230 decreases to a pre-determined level, the controller 240 sets the I/O pin that is coupled with the charge storage circuit to an INPUT state (e.g. high impedance), thereby effectively electrically isolating the valve-picking charge storage circuit from the capacitor 230. Thus, in this embodiment, the controller 240 controls the charging of the capacitor 282 based, at least in part, on the amount of current and voltage supplied by the DC-DC converter 220.

For the circuit 200, the placement of the capacitor 282 offers certain advantages over other configurations, such as a configuration where the capacitor 282 is simply placed in parallel with the capacitor 230. For example, the arrangement shown in FIG. 2 allows the controller 240 to effect the use of substantially all of the energy stored in the capacitor 282 for valve picking. This is accomplished by switching the I/O pin used to charge the capacitor 282 to the INPUT state before a valve is picked. Thus, if the capacitor 282 is deeply discharged while picking a valve, the resultant low voltage state on the capacitor 282 will not affect the controller 240's supply voltage, as would be the case if the capacitor 282 was connected in parallel with the capacitor 230. In this respect, for a configuration where the capacitor 282 is placed in parallel with 230, the controller 240 could only use a portion of the energy stored in the capacitor before affecting the functionality of the controller 240 (by causing the supply voltage of the controller 240 to fall below an operating threshold of the controller 240). In this situation, the residual energy in 282 (to maintain the controller 240's supply voltage above the operating threshold) could typically not be used for picking a valve.

Another advantage of coupling the capacitor 282 in the fashion shown in FIG. 2, is that it provides a 'backup' source of electrical energy for the controller 240 in the event that the DC-DC converter 220 and the capacitor 230 are temporarily unable to provide enough electrical energy to the programmable controller 240. In this regard, the energy stored on the capacitor 282 may be supplied to the controller 240 via the I/O pin of the controller 240 to which it is coupled via the resistor 281. In this regard, the I/O pins of the controller 240 are bidirectional when placed in the OUTPUT HIGH state. Therefore, in such a situation, the controller may sense that its supply voltage is below a predetermined level and, as a result, may set the I/O pin coupled with the capacitor 282 (via the resistor 281) to the OUTPUT HIGH state. Alternatively, the I/O pin may be left in the OUTPUT HIGH state, such that the voltage on the capacitor 282 tracks with the voltage on the capacitor 230. The electrical energy stored on the capacitor 282 may then be communicated to the power supply bus of the controller 240 in order to prevent its supply voltage from falling below the operating threshold.

The valve-picking circuit 280 further comprises a valve-picking switch 283, which takes the form of an NMOS device for this embodiment. A gate terminal of the NMOS valve-picking switch 283 is coupled with a resistive-capacitive current control circuit that includes a resistor 284 and a capacitor 285. The current control circuit is configured such that the capacitor 285 maintains a substantially constant voltage level on the gate of valve-picking switch 283. In this respect, the resistor 284 regulates charging of the capacitor 285, which is used for driving the gate of the valve-picking switch 283.

When it is desired to pick a valve, such as the valve 270', the controller 240 sets an I/O pin coupled with the valve-picking-switch 283 (via resistor 284) to an OUTPUT HIGH state, which charges the capacitor 285 to turn on the valve-picking switch 283. The electrical energy stored on the capacitor 282 is then communicated to the valve 270'. Using an analog to digital (A/D)converter included in the controller 240, the controller 240 senses and/or monitors the voltage on the valve coil, which is present on a signal line 271 of the circuit 200.

When the A/D converter senses that the valve coil voltage has reached a pre-determined level, the controller 240 sets the I/O pin coupled with the valve-picking switch 283 (via the resistor 281) to the INPUT state, effectively electrically isolating the capacitor 285 from power supply voltage of the controller 240 (and from DC-DC converter and the capacitor 230). The capacitor 285 then holds the voltage level on the gate of the valve-picking switch 283 substantially constant and, thus, keeps the voltage on the valve coil substantially constant at the desired level as charge will continue to be communicated from the capacitor 282 to the valve 270'.

Once picking of the valve is effected, the controller 240 then sets the I/O pin coupled to the gate of the valve-picking switch 283 (via the resistor 281) to an OUTPUT LOW state (e.g. electrical ground) to discharge the capacitor 285 and, as a result, decouple the valve-picking charge storage circuit from the valve 270'. Therefore, the current control circuit, at least in part, controls the operation of the NMOS valve-picking switch 283 responsive to electrical signals from the controller 240, so that an adequate level of valve-picking current is delivered to the valve coil of the valve being picked.

The electrical energy stored on the capacitor 282 may be supplied to either valve 270 or 270' to pick (open) the valve(s). The voltage on the valve coil of the valve 270 or the valve 270' is controlled by the controller 240 to supply the picking current so as not to increase the voltage present at the drain terminal of the NMOS valve control switches 260 and 260' beyond the point that would forward bias the intrinsic diode 253 of the PMOS safety switch device 250. It will be appreciated that the voltage to forward bias the intrinsic diode 253 would be approximately the junction voltage of the diode 253 plus the voltage of the DC source 210. Such a situation would result in current from the valve-picking circuit 280 flowing through the diode 253 back to the DC source 210, in addition to the current flowing through the valve control switch 260 or 260' to pick valve 270 or 270', thus reducing the amount of electrical energy available to pick the valve. It will be appreciated, however, that the voltage on the valve 270 or 270' must be of a high enough potential to allow a sufficient amount of current to be generated, so as to pick the valve. In this regard, as an example, the voltage on the valve 270' is sensed via signal line 271 by another A/D converter included in the controller 240. Alternatively, such A/D converters may be external to the controller 240. Controller 240 may then control the voltage present at the valve 270' by controlling an electrical signal supplied to the gate of the valve-picking switch 283 based on the sensed voltage.

Figure 3:
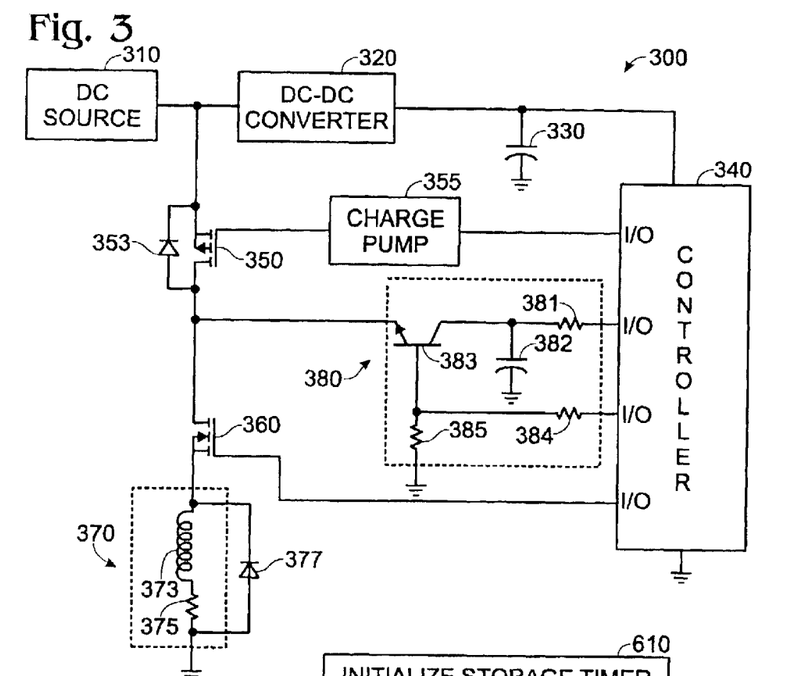
FIG. 3 is a schematic/block diagram illustrating another valve control circuit in accordance with another embodiment of the invention.

Referring now to FIG. 3, a schematic/block diagram of another valve control circuit 300 is shown. The circuit 300 is substantially the same as the circuit 200 shown in FIG. 2. However, the circuit 300, as shown, comprises a single valve 370 and associated circuitry. Additionally, the valve-picking circuit 380 is of a different configuration than the valve-picking circuit 280 shown in FIG. 2. Therefore, for the sake of brevity, not all of the details of the circuit 300 will be discussed here.

In this regard, the valve-picking circuit 380 includes a resistive-capacitive charge storage circuit that comprises a resistor 381 and a capacitor 382 in similar fashion as the valve-picking circuit 280. However, the valve-picking switch 383 for the circuit 300 takes the form of an npn-type bipolar transistor. A base terminal of the npn-type bipolar valve-picking switch 383 is biased with a voltage divider circuit that includes a resistor 384 and a resistor 385. This voltage divider is configured so as to control the picking current flow through the valve-picking switch 383, so as to maintain a voltage at the drain terminal of the NMOS valve control switch 360 at level that will not forward bias the intrinsic diode 353 of the PMOS safety switch device 350, but of a high enough potential to allow a sufficient amount of current to be generated, so as to pick the valve 380, as was discussed with respect to FIG. 2.

Unlike the circuit 200 shown in FIG. 2, the circuit 300 does not include a signal line to sense the coil voltage of the valve 370 while it is being picked. In this regard, because the valve-picking switch 383 (an NPN bipolar device) has a relatively stable bias voltage (Vbe) and the supply voltage of the controller 240 is well regulated by the controller, the base voltage of the valve-picking switch 383 can be regulated by the values selected for the resistors 384 and 385, so as to provide sufficient picking voltage and/or current for the valve 370.

The configuration of the valve-picking circuit 380 also differs from the valve-picking circuit 280 in other respects. For example, the use of the npn-type bipolar valve-picking switch 383 provides a temperature compensation effect for the circuit 300. In this respect, as the ambient temperature to which the circuit 300 is exposed increases, the resistance of the resistor 375 of the valve 370 also increases. Therefore, in order to pick the valve 370, a higher voltage is needed to supply the picking current. However, because the forward drop of the base-emitter junction of the valve-picking switch 383 has a negative temperature coefficient (e.g. an increase in temperature results in a reduction of the drop), the voltage applied to the valve 370 would increase due the fact that a substantially constant voltage is supplied to the base of the valve-picking switch 383 by the voltage divider that includes the resistors 384 and 385. Therefore, a temperature compensation effect is realized due to the use of the npn-type bipolar valve-picking switch 383.

Figure 4:
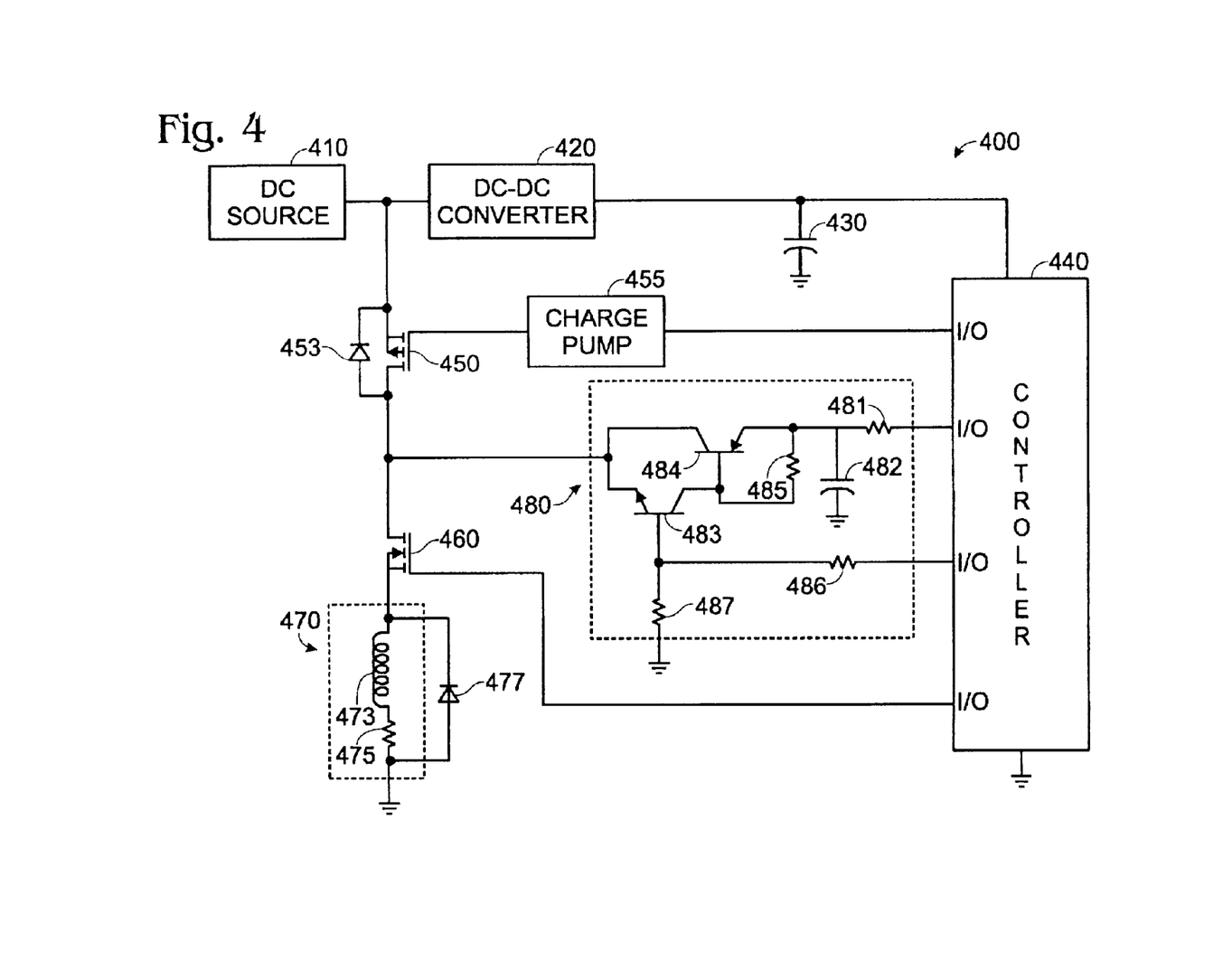
FIG. 4 is a schematic/block diagram illustrating yet another valve control circuit in accordance with yet another embodiment of the invention.

Referring now to FIG. 4, a schematic/block diagram of yet another valve control circuit 400 is shown. The circuit 400 is substantially the same as the circuit 300 shown in FIG. 3. However, the valve-picking circuit 480 is of still a different configuration than the valve-picking circuits 280 and 380 shown, respectively, in FIGS. 2 and 3. Therefore, for the sake of brevity, not all of the details of the circuit 400 will be discussed here.

The valve-picking circuit 480 includes a resistive-capacitive charge storage circuit that comprises a resistor 481 and a capacitor 482 in similar fashion as the valve-picking circuits 280 and 380. The valve-picking switch for the circuit 400 takes the form of a complimentary transistor pair that comprises an npn-type bipolar transistor 483 and a pnp-type bipolar transistor 484. A base terminal of the npn-type bipolar transistor 483 is biased with a voltage divider circuit that includes a resistor 486 and a resistor 487. This configuration uses less base current for the npn-bipolar transistor 483 than the circuit 300 and, therefore, the voltage divider resistors 486 and 487 may be higher in resistance than resistors 384 and 385. Such a configuration would consume less power in the resistors 486 and 487, allowing more power to be available for the controller 440 and putting less load on the charge storage device 430. The pnp-type bipolar transistor 484 is then employed to communicate the picking current to the valve 470 from the electrical energy stored on the capacitor 482. The use of the complimentary transistor pair in the circuit 400 also provides a temperature compensation effect similar that which was discussed with respect to the circuit 300.

Figure 5:
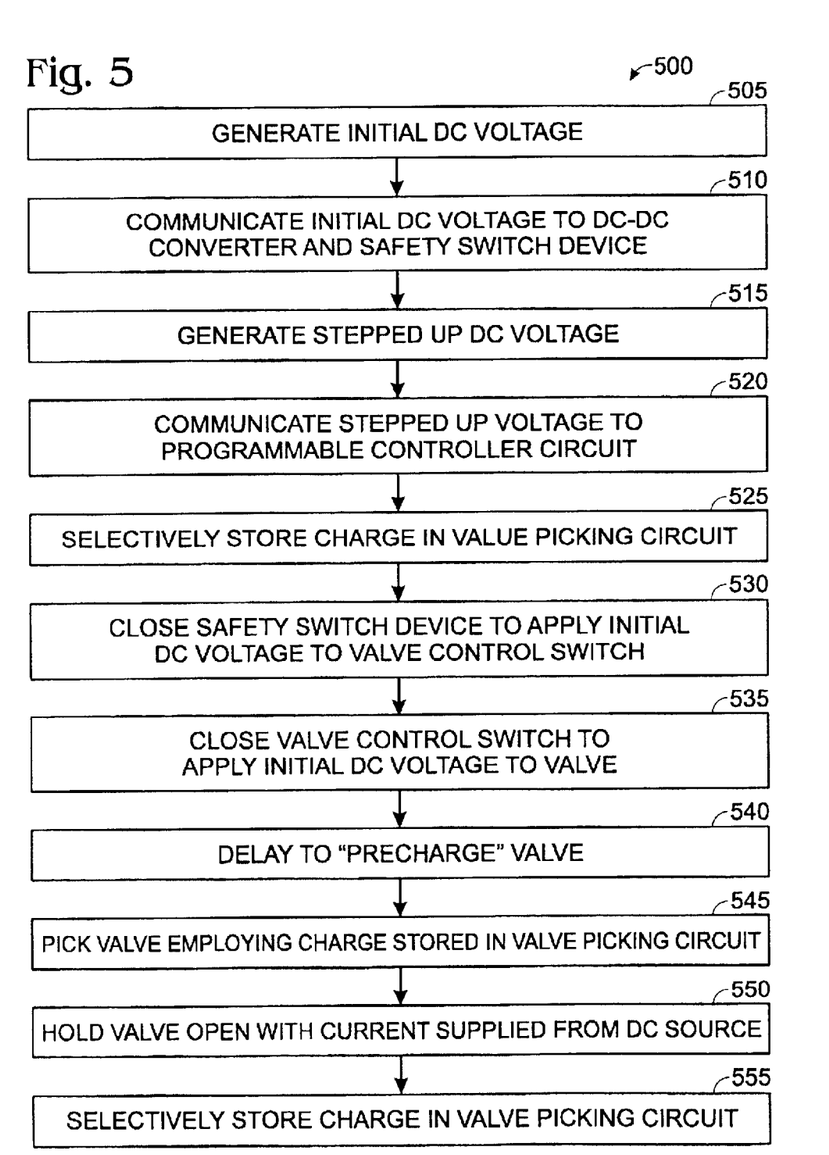
FIG. 5 is a flowchart illustrating a method of controlling valves in accordance with an embodiment of the invention.

Referring now to FIG. 5, a flowchart illustrating a method 500 of valve control is shown. The method 500 will be described with further reference to FIG. 2, however, it will be appreciated that the method 500 may be implemented using any number of valve control circuits and is not limited in this respect to the use of the circuit 200. Alternatively, for example, the method of claim 1 may be employed with the circuits 300 or 400 shown, respectively, in FIGS. 3 and 4.

The method 500, at block 505, comprises generating an initial direct current (DC) voltage, such as with the DC source 210. The initial DC voltage is then communicated to the DC-DC converter 220 and the safety switch device 250 at block 510. At block 515, the DC-DC converter 220 generates a stepped up DC voltage. The stepped up DC voltage is communicated the controller 240 at block 520. At block 525, charge from the stepped up voltage is selectively stored on the capacitor 282 of the valve-picking circuit 280 via the controller 240. The selective storage of electrical energy in the capacitor 282 is described in further detail below with respect to FIG. 6.

At block 530, the safety switch device 250 is closed using the charge pump 255. Closing the safety switch device 250 applies the initial DC voltage to the valve control switches 260 and 260' at block 530. The controller 240, so as to apply the initial DC voltage to the valve 270 or 270', at block 535, closes the respective valve control switch 260 or 260'. Such application of the initial DC voltage to the valve 270 or 270' may be termed "pre-charging" the valve.

At block 540, the controller 240 waits for a predetermined period of time (delay) to allow current to build up in the valve coil (e.g. to pre-charge the valve) using DC source 210. This current build up reduces the energy that is supplied from the capacitor 282 during valve picking. At block 545, the valve 270 or 270' is picked using the charge stored in the valve picking charge storage circuit of the valve picking circuit 280. The process of picking valve 270 or 270' is described in further detail below with respect to FIG. 7, while the process of picking the valves of the circuit 300 and the circuit 400 is described with reference to FIG. 8.

After the valve 270 or 270' is picked, it is then held open with current from the DC source 210 it block 550. At block 555, the programmable controller re-charges the valve-picking charge storage circuit, so as to provide a backup power source for the controller 240 and/or to have electrical energy available in the event it is desirable to pick an additional valve, or re-pick the same valve.

Figure 6:
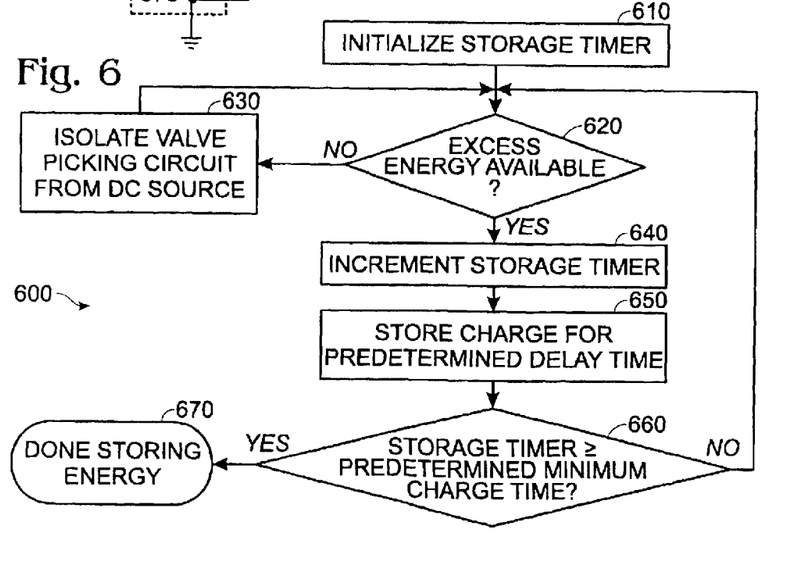
FIG. 6 is a flowchart illustrating a method for charging a valve-picking charge storage circuit in accordance with an embodiment of the invention.

Referring now to FIG. 6, a flowchart illustrating an embodiment of method 600 for selectively storing charge in a valve picking circuit, such as 280, is shown. It will be appreciated that this method may be employed with other valve-picking circuits, such as the valve picking circuits 380 and 480 shown, respectively, in FIGS. 3 and 4. The method 600, comprises, at block 610, initializing a storage timer. Such a storage timer may be a software based timer implemented in the controller 240, or may be a hardware timer implemented in the controller 240 or external to the controller 240. The invention is, of course, not limited to any particular timer configuration.

At block 620, the controller 240 determines whether excess energy is available on the capacitor 230. In this respect, the controller 240 may use an A/D converter to sense the voltage on the capacitor 230. The sensed voltage may then be compared to a minimum operating voltage of controller 240. If the sensed voltage is higher than the minimum operating voltage by a predetermined amount, the controller 240 will determine that excess electrical energy exists.

In the situation where the controller 240 determines that excess energy does not exist, the voltage on the capacitor 230 will continue to be monitored until excess energy is available. If the valve picking circuit is coupled with the DC-DC converter 220 and the capacitor 230 (via the controller 240), such as from a previous charge storage sequence (as described below), the valve picking circuit 280 is isolated from the capacitor 230 (and the DC-DC converter 220) at block 630. For the circuit 200, this isolation may be accomplished by setting the I/O pin of the controller 240 with which the valve-picking charge storage circuit is coupled to the INPUT state, presenting a high impedance to the valve picking charge storage circuit.

When it is determined, at block 620, that excess energy is available, the controller 240 increments the charge storage timer by a predetermined value at block 640. At block 650, the controller 240 sets the I/O pin coupled with the charge storage circuit of the valve-picking circuit 280 to an OUTPUT HIGH state for a period of time corresponding with the value by which the storage timer was incremented at block 640, and charge is stored on the capacitor 283.

At block 660, the value in the charge storage timer (which indicates the cumulative charge storage time) is compared with a predetermined charge time threshold that represents a time for storing sufficient charge to effect the picking of a valve. If the charge storage timer is less than the minimum charge storage time, the method 600 returns to block 620 and the foregoing process is repeated. If the value in the charge storage timer is greater than or equal to the charge time threshold, the controller 240 isolates the valve-picking charge storage circuit from the capacitor 230 (as described above) and the charge storage process of method 600 is ended at block 670, as sufficient charge for picking a valve is stored in the capacitor 282. Alternatively, as described above, the controller 240 may leave the I/O pin coupled with the capacitor 282 in the OUTPUT HIGH state, so as to allow the voltage on the capacitor 282 to track the voltage on the capacitor 230.

Figure 7:
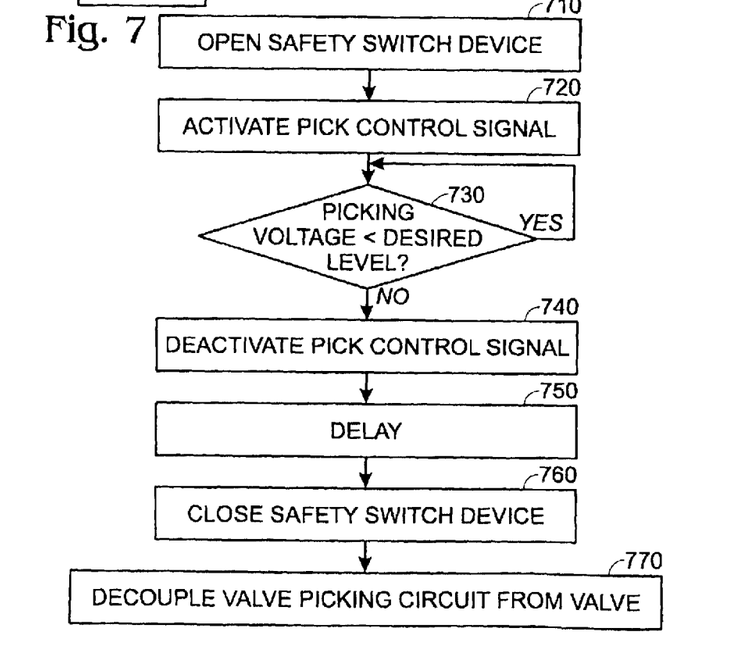
FIG. 7 is a flowchart illustrating a method for picking a valve that may be employed with the valve control circuit shown in FIG. 2.

Referring now to FIG. 7, a flowchart illustrating an embodiment of a method 700 for picking a valve, such as the valves of the circuit 200, is shown. The method 700 may be employed, for example, as block 545 of the method 500 shown in FIG. 5. Such a method would typically be executed after sufficient charge to effect the picking of a valve has been stored in, for example, the capacitor 282 and the valve has been "pre-charged", as described above with reference to FIG. 5. For the circuit 200, the method 700 comprises, at block 710, isolating the valve 270', for example, from the DC source 210 by opening the safety switch device 250. At block 720, a picking control signal is activated. For the circuit 200, activating the picking control signal comprises setting an I/O pin of the controller 240 coupled with the resistor 284 and the capacitor 285 to the OUTPUT HIGH state, which will charge the capacitor 285 and apply voltage to the gate of the valve-picking switch 283.

As the voltage on the gate of the valve picking switch 283 rises, the charge stored in the capacitor 282 will start to be communicated to the valve 270' for picking the valve. At block 730, the controller 240 monitors the voltage on the coil of the valve 270' and compares that voltage to a desired picking voltage level, which, as discussed above, is high enough to generate sufficient current to pick the valve yet remain below the forward bias voltage of the intrinsic diode 253 of the safety switch device 250 (e.g., the junction voltage of the diode 253 plus the voltage of the DC source 210). Once the desired picking voltage level is reached, the controller deactivates the picking control signal at block 740 (sets the I/O pin to the INPUT state). The capacitor 285, will maintain the voltage on the gate of the valve-picking switch 283 and charge will continue to be communicated from the capacitor 282 to pick the valve 270'. After a predetermined valve-picking time (block 750), the valve 270' is coupled with the DC source 210 by closing the safety switch device 250 at block 760. At block 770, the valve picking circuit 280 is decoupled from the valve 270' by setting the I/O pin coupled with the resistor 284 and the capacitor 285 to an OUTPUT LOW state, which results in the capacitor 285 being discharged and, in turn, opens the valve-picking switch 283.

Figure 8:
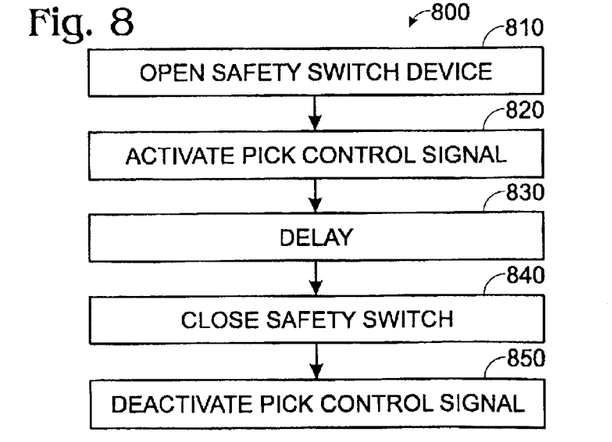
FIG. 8 is a flow chart illustrating a method for picking a valve that may be employed with the valve control circuits shown in FIGS. 3 and 4.

Referring now to FIG. 8, a flowchart illustrating an alternative embodiment of a method 800 for picking a valve, such as the valve 370 of the circuit 300 or the valve 470 of the circuit 400, is shown. The method of FIG. 8 is, of course, not limited to being implemented only with the circuits 300 and 400, and other applications may exist. As with the method 700, the method 800, with reference to FIG. 3, would typically be executed after sufficient charge to effect the picking of a valve has been stored in, for example, the capacitor 382 and the valve 370 has been "pre-charged", as described above with reference to FIG. 5.

At block 810, the valve 370 is isolated from the DC source 310 by opening the safety switch device 350, which is accomplished by ceasing to pump the charge pump 355. At block 820, setting the I/O pin of the controller 340 coupled with the voltage divider that includes the resistor 384 and the resistor 385 to an OUTPUT HIGH state activates the picking control signal. This applies a substantially constant voltage to the base of the valve picking switch 383, which is relatively temperature insensitive, as was previously described. In this regard, the controller does not monitor the voltage on the valve 380, as the voltage applied to the valve 380 may be controlled by the values of the resistors 384 and 385. The voltage applied to valve 480 of the circuit 400 in FIG. 4 may similarly be controlled by the selection of the values of the resistors 486 and 487.

Referring again to FIG. 8 with further reference to FIG. 4, after a predetermined picking time delay (block 830) during which charge from the capacitor 482 is communicated to the valve 470 to pick the valve the controller begins to pump the charge pump 455 again at block 840. Pumping the charge pump 455 results in the safety switch device 450 closing to couple the DC source with the valve 470. At block 850, the pick control signal is deactivated, such as by setting the I/O pin coupled with voltage divider (including the resistors 486 and 487) to the INPUT state or the OUTPUT LOW state, which completes the valve picking process of the method 800.

While certain features of the invention have been illustrated and described herein, many modifications, substitutions, changes and equivalents will now occur to those skilled in the art. It is, therefore, to be understood that the appended claims are intended to cover all such modifications and charges as fall within the true spirit of the invention.

What is claimed is:

1. A control circuit comprising:

a direct current (DC) voltage source;

a DC to DC (DC-DC) step up converter coupled with the DC voltage source;

a programmable controller coupled with the DC-DC converter;

a first valve control switch coupled with the DC source and the controller;

a first valve coupled with the first valve control switch; and a valve-picking circuit coupled with the controller such that the valve-picking circuit is selectively coupled with the first valve via the first valve control switch to supply current to open the first valve in response to electrical signals from the controller.

2. The circuit of claim 1, further comprising a safety switch device, wherein the first valve control switch is coupled with the DC source via the safety switch device; and a safety switch control circuit coupled with the safety switch device, such that the safety switch control circuit effects opening and closing of the safety switch device.

3. The circuit of claim 2, wherein the safety switch control circuit is further coupled with the controller and operates based, at least in part, on electrical signals received from the controller.

4. The circuit of claim 3, wherein the safety switch device comprises a p-type metal-oxide semiconductor transistor (PMOS) device and the safety switch control circuit comprises a charge pump circuit coupled with a gate terminal of the PMOS device.

5. The circuit of claim 1, wherein the valve-picking circuit comprises:

a selectable current source that includes a resistive capacitive charge storage circuit; and a valve-picking switch, wherein the charge storage circuit is coupled with the first valve control switch via the valve-picking switch.

6. The circuit of claim 5, wherein the valve-picking circuit further comprises a current control circuit for controlling the operation of the valve-picking switch.

7. The circuit of claim 6, further comprising a signal line coupling the valve with an analog to digital (A/D) converter, such that the A/D converter senses a voltage present on the valve and the controller controls the voltage on the valve via the valve-picking switch based on the voltage on the valve determined by the A/D converter.

8. The circuit of claim 6, wherein the valve-picking switch comprises an n-type metal-oxide semiconductor transistor device.

9. The circuit of claim 5, wherein the valve-picking switch produces a temperature compensation effect.

10. The circuit of claim 9, wherein the valve-picking switch comprises an npn-type bipolar transistor.

11. The circuit of claim 9, wherein the valve-picking switch comprises a complimentary transistor pair.

12. The circuit of claim 11, wherein the transistor pair comprises an npn-type bipolar transistor coupled with a pnp-type bipolar transistor, wherein an electrical signal applied to a base terminal of the npn-type bipolar transistor results in the resistive-capacitive charge storage circuit being coupled with the first valve control switch via the pnp-type bipolar transistor.

13. The circuit of claim 1, further comprising:

a second valve control switch; and a second valve coupled with the second valve control switch, wherein the second valve control switch and the second valve are coupled in parallel with the first valve control switch and the first valve.

14. The circuit of claim 13, wherein the first and second valves comprise millivolt valves; and the first and second valve control switches each comprises an n-type metal-oxide semiconductor device.

15. A valve control circuit comprising:

a direct current (DC) voltage source;

a DC to DC (DC-DC) step-up converter coupled with the DC voltage source;

a programmable controller coupled with the DC-DC converter;

a first valve control switch coupled with the DC source and the controller;

a first valve coupled with the first valve control switch;

a second valve control switch coupled with the DC source and the controller;

a second valve coupled with the second valve control switch, wherein the second valve control switch and the second valve are coupled in parallel with the first valve control switch and the first valve;

a safety switch device, wherein the first and second valve control switches are coupled with the DC source via the safety switch device;

a safety switch control circuit coupled with the safety switch device, such that the safely switch control circuit effects opening and closing of the safety switch device;

a valve-picking circuit having a selectable current source coupled with the controller such that the current source is selectively coupled with the primary switch to actuate the first valve in response to electrical signals from the controller.

16. The circuit of claim 15, wherein the DC voltage source is a thermally activated voltage source.

17. The circuit of claim 16, wherein the thermally activated voltage source is a thermopile device.

18. The circuit of claim 15, wherein the first and second valves are millivolt valves.

19. The circuit of claim 15, wherein the valve-picking circuit comprises:

a resistive capacitive charge storage circuit; and a valve-picking switch, wherein the charge storage circuit is coupled with the first and second valve control switches via the valve-picking switch.

20. The circuit of claim 19, wherein the valve-picking circuit further comprises a current control circuit for controlling the operation of the valve-picking switch.

21. The circuit of claim 20, wherein the valve-picking switch comprises an n-type metal-oxide semiconductor transistor device.

22. The circuit of claim 19, wherein the valve-picking switch comprises an npn-type bipolar transistor that produces a temperature compensation effect.

23. The circuit of claim 19, wherein the valve-picking switch comprises a complimentary transistor pair that produces a temperature compensation effect.

24. A method of controlling one or more valves comprising:

generating an initial direct current (DC) voltage;

communicating the initial DC voltage to a DC to DC (DC-DC) converter;

stepping up the DC voltage with the DC-DC converter to generate a stepped up DC voltage;

communicating the stepped up voltage to a programmable controller circuit;

selectively storing charge in a valve-picking circuit via the controller circuit;

applying the initial DC voltage to a valve control switch;

closing the valve control switch to apply the initial DC voltage to a valve;

waiting a predetermined period of time for the valve to pre-charge with the initial DC voltage;

opening the valve with a first current generated by the charge stored in the valve-picking circuit based, at least in part, on electrical signals generated by the controller; and holding the valve open with a second current generated by the DC source.

25. The method of claim 24, wherein applying the initial DC voltage to the valve control switch comprises closing a safety switch device coupled between the DC source and the valve control switch.

26. The method of claim 25, further comprising communicating a signal from the controller to a charge pump circuit, wherein the charge pump circuit is coupled with a control terminal of the safety switch device.

27. The method of claim 24, wherein opening the valve comprises communicating a signal to a valve-picking switch, such that the valve-picking switch closes to couple a charge storage circuit of the valve-picking circuit with the valve via the valve control switch.

28. The method of claim 24, further comprising selectively storing charge in a valve-picking circuit via the controller circuit again after opening the valve.

29. The method of claim 24, wherein selectively storing charge in the valve picking circuit comprises:

initializing a charge storage timer;

determining if excess electrical energy is available from the stepped up voltage;

incrementing the charge storage timer;

storing charge from the excess electrical energy for a predetermined charge time;

determining if a value in the charge storage timer is greater than charge time threshold.

30. The method of claim 29, further comprising isolating the valve picking circuit from the stepped up voltage if excess electrical energy is not available.

31. The method of claim 29, further comprising isolating the valve picking circuit from the stepped up voltage when the value in the charge storage timer is greater than the charge time threshold.

32. The method of claim 29, farther comprising coupling the valve picking circuit with the stepped up voltage when the value in the charge storage timer is greater than the charge time threshold, such that a voltage of the charge stored in the valve picking circuit tracks the stepped up voltage.

33. The method of claim 29, further comprising:

determining if further excess electrical energy is available when the value in the charge storage timer is less than the charge time threshold;

incrementing the charge storage timer;

storing charge from the further excess electrical energy for the predetermined charge time;

determining, again, if the value in the charge storage timer is greater than the charge time threshold.

34. The method of claim 24, wherein opening the valve with a first current generated by the charge stored in the valve-picking circuit comprises:

isolating the valve from the initial DC voltage;

activating a picking-control signal to couple the valve picking-circuit with the valve, so as to communicate the charge stored in the valve-picking circuit to the valve;

monitoring a voltage on the valve;

determining if the voltage on the valve is above a predetermined level;

deactivating the picking-control signal;

waiting a predetermined valve-picking time;

coupling the initial DC voltage with the valve; and decoupling the valve picking circuit from the valve.

35. The method of claim 24, wherein opening the valve with a first current generated by the charge stored in the valve-picking circuit comprises:

isolating the valve from the initial DC voltage;

activating a picking-control signal to couple the valve picking-circuit with the valve, so as to communicate the charge stored in the valve-picking circuit to the valve, wherein the picking control signal is applied via a voltage divider circuit;

waiting a predetermined valve-picking time;

coupling the initial DC voltage with the valve;

deactivating the pick control signal to decouple the valve-picking circuit from the valve.

\* \* \* \* \*